United States Patent [19]

Farber et al.

[11] Patent Number: 4,757,249
[45] Date of Patent: Jul. 12, 1988

[54] VEHICLE DUAL ELECTRICAL SYSTEM

[75] Inventors: Arnold S. Farber, Cedar Falls; Charles W. Formwalt, Jr., Janesville; Kenneth D. Baxter, Cedar Falls; Donald K. Pfundstein, Denver, all of Iowa

[73] Assignee: Deere & Company, Moline, Ill.

[21] Appl. No.: 61,618

[22] Filed: Jun. 15, 1987

[51] Int. Cl.⁴ .............................................. H02J 7/14
[52] U.S. Cl. ........................................ 320/15; 307/84; 322/7
[58] Field of Search .................................. 320/15–17; 322/7, 8, 90, 94; 307/84

[56] References Cited

U.S. PATENT DOCUMENTS

| | | |
|---|---|---|
| 2,085,275 | 6/1937 | Schmidt . |
| 3,763,415 | 10/1973 | Ownby ...................... 320/6 |
| 4,336,485 | 6/1982 | Stroud ...................... 320/15 |
| 4,347,473 | 8/1982 | Stroud ...................... 320/15 |
| 4,454,464 | 6/1984 | Stroud ...................... 322/28 |
| 4,539,515 | 9/1985 | Morishita et al. ............ 320/17 |

Primary Examiner—R. J. Hickey

[57] ABSTRACT

A vehicle electrical system includes dual alternator/battery sets separately connected to separate non-critical electrical loads, and both connected through a diode circuit to a critical electrical load. A starter switch connects both batteries to the engine starter motor.

1 Claim, 1 Drawing Sheet

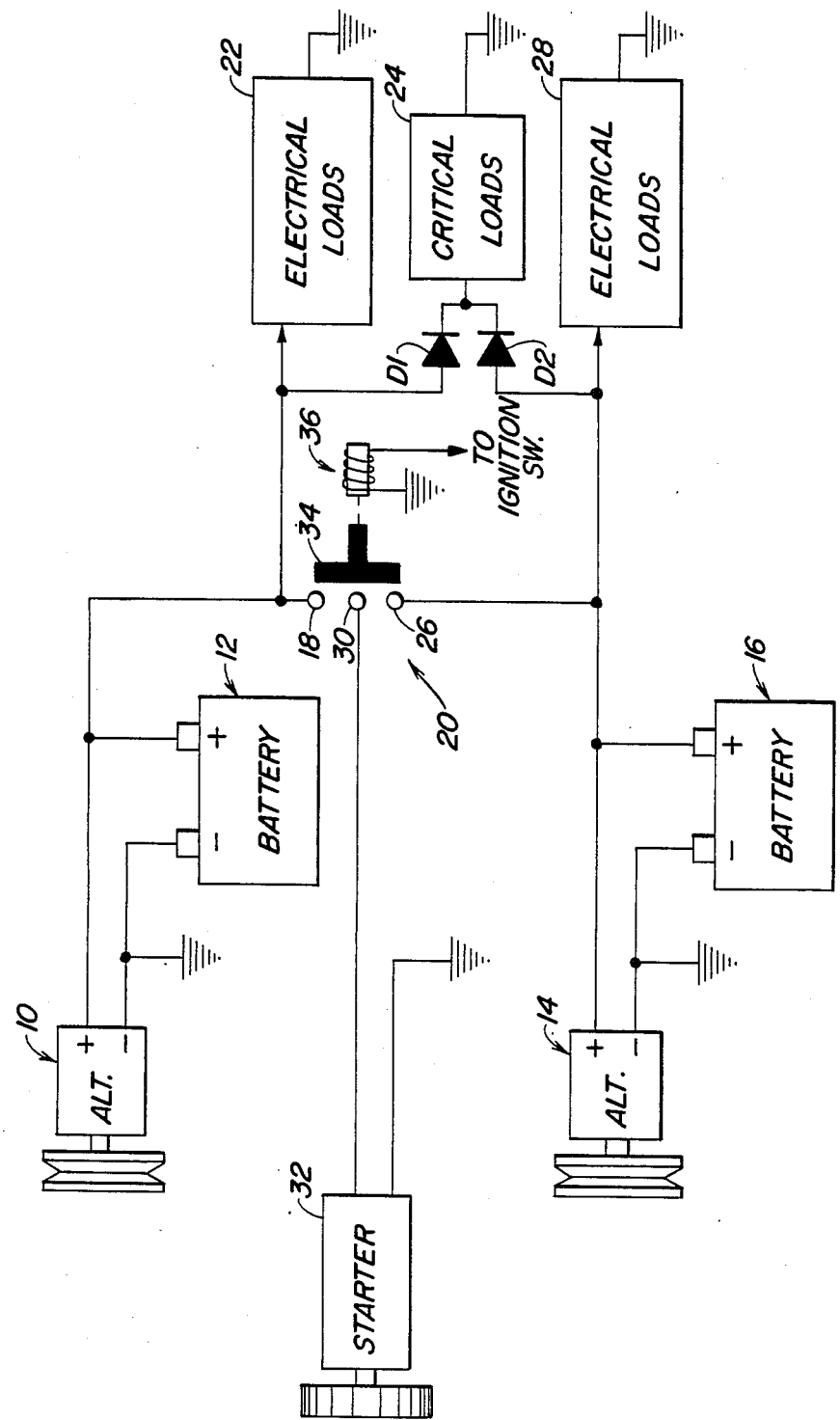

VEHICLE DUAL ELECTRICAL SYSTEM

BACKGROUND OF THE INVENTION

The present invention relates to a vehicle electrical system with dual generator/battery sets.

Typical vehicle starting and charging systems usually include a single alternator or generator, a single starter motor, a single battery composed of many cells in series and/or in parallel and a multiplicity of loads. Such systems are usually protected by fusing the individual loads. With such a system, a failure of the generator or alternator will result in depletion of the battery and the interruption of power to all the loads.

A dual alternator, dual battery emergency vehicle electrical system is described in U.S. Pat. No. 4,347,473 issued Aug. 31, 1982 to Stroud. In the Stroud system, there are two electrical load groups—an emergency load group and a "vehicle chassis" load group. The vehicle chassis load group includes loads such as the vehicle lights, radio, heating and cooling system, starting circuit and ignition circuit. Thus, with the Stroud system, under normal circumstances, energy from only one battery will be available to the starting circuit.

Also in the Stroud system, there is no group of electrical loads which is permanently connected to both batteries. Furthermore, a short circuit fault in either load will draw current from both alternators.

SUMMARY OF THE INVENTION

An object of the present invention is to provide a dual alternator/battery vehicle electrical system wherein at least some critical electrical loads are permanently connected to both alternator/battery sets.

Another object of the present invention is to provide such an electrical system with a starter switch which automatically connects the starter to both batteries.

A further object of the present invention is to provide such a vehicle electrical system with separate loads connected to separate alternator/battery sets in such a way that a short circuit fault in one load will not draw current from both alternator/battery sets.

These and other objects are achieved by the present invention with includes a first alternator/battery set and a second alternator/battery set. Each alternator/battery set is directly and separately connected to a corresponding non-critical group of electrical loads. Both alternator/battery sets are also connected via a pair of diodes to a critical group of electrical loads. A starter switch simultaneously connects both batters to the vehicle starter.

BRIEF DESCRIPTION OF THE DRAWING

The sole FIGURE is an electrical schematic diagram of the electrical system of the present invention.

DETAILED DESCRIPTION

The vehicle electrical system shown in the sole figure includes a first engine driven generator 10 connected in parallel with a first battery 12, and a second engine driven generator 14 connected in parallel with a second battery 16. The term "generators" is used herein in its generic sense to include either a conventional vehicle generator with mechanical rectification or a conventional vehicle alternator with diode rectification.

The + terminals of alternator 10 and battery 12 are connected together and to one terminal 18 of solenoid-operated starter switch 20, to a first non-critical electrical load 22 and to a critical electrical load 24 via a diode D1. The + terminals of alternator 14 and battery 16 are connected together and to another terminal 26 of switch 20, to a second non-critical electrical load 28 and to the critical load 24 via diode D2. A third terminal 30 of switch 2 is connected to a conventional starter motor 32. The starter switch 20 includes a contact member 34 which is movable upon energization of the starter solenoid 36 to simultaneously electrically interconnect terminals 18, 26 and 30 so that both batteries 12 and 16 supply current to the starter motor 32.

With the above-described electrical system, the critical load 24 is permanently connected to both alternator/battery sets so that energy will be available to the critical load 24 even if there is a failure of one of the alternator/battery sets. On the other hand, the non-critical loads are normally connected (when starter switch 20 is open) only to one of the alternator/battery sets so that failure in one load will not influence both alternator/battery sets.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. An electrical system for a vehicle having an engine and an electrical starter motor, the electrical system comprising:
    a first engine driven electric generator;
    a second engine driven electric generator;
    a first battery connected to the first generator, the first battery having grounded and ungrounded terminals;
    a second battery connected to the second generator, the second battery having grounded and ungrounded terminals, the ungrounded terminals of both batteries normally having substantially the same electrical potential;
    a first non-critical electric load normally connected only to the first generator and to the first battery;
    a second non-critical electric load normally connected only to the second generator and to the second battery;
    a critical electrical load;
    a diode circuit connecting the critical load to both generators and to the ungrounded terminals of both batteries, the diode circuit comprising a first diode with an anode connected to the first generator and to the first battery, and a second diode with an anode connected to the second generator and to the second battery, the cathodes of both diodes being connected to the critical load; and
    a starter switch operable to simultaneously connect both the ungrounded terminals of both batteries to the starter motor.

* * * * *